US009355136B2

(12) United States Patent
White

(10) Patent No.: US 9,355,136 B2
(45) Date of Patent: May 31, 2016

(54) AUTOMATING GENERATION OF MESSAGES IN ACCORDANCE WITH A STANDARD

(71) Applicant: International Business Machines Corporation, Armonk, NY (US)

(72) Inventor: David F. White, Dublin, OH (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 467 days.

(21) Appl. No.: 13/887,881

(22) Filed: May 6, 2013

(65) Prior Publication Data

US 2014/0330799 A1 Nov. 6, 2014

(51) Int. Cl.
*G06F 7/00* (2006.01)
*G06F 17/30* (2006.01)

(52) U.S. Cl.
CPC .................. *G06F 17/30371* (2013.01)

(58) Field of Classification Search
CPC .......... G06F 17/30371; G06F 17/2705; G06F 21/6254
USPC .................................. 707/755, 756
See application file for complete search history.

(56) References Cited

U.S. PATENT DOCUMENTS

| 5,710,889 | A  | * | 1/1998  | Clark et al. ............. 235/379 |
| 2002/0099633 | A1 | * | 7/2002  | Bray ....................... 705/35 |
| 2006/0200478 | A1 | * | 9/2006  | Pasztor et al. ............ 707/100 |
| 2006/0288270 | A1 | * | 12/2006 | Gaurav et al. ............ 715/506 |
| 2007/0255704 | A1 | * | 11/2007 | Baek et al. .................. 707/6 |
| 2008/0168109 | A1 | * | 7/2008  | Gaurav et al. ............ 707/203 |
| 2010/0114899 | A1 | * | 5/2010  | Guha et al. ............... 707/741 |
| 2011/0153667 | A1 | * | 6/2011  | Parmenter et al. ....... 707/780 |
| 2012/0179684 | A1 | * | 7/2012  | Alba et al. ............... 707/738 |
| 2013/0144863 | A1 | * | 6/2013  | Mayer et al. ............. 707/711 |
| 2014/0122389 | A1 | * | 5/2014  | Riskin ..................... 706/12 |

OTHER PUBLICATIONS

Rohn, E., Generational analysis of tension and entropy in data structures: impact on automatic data integration and on the semantic web, Knowl Inf Syst (2011) 28:175-196.*

(Continued)

*Primary Examiner* — Cheyne D Ly
(74) *Attorney, Agent, or Firm* — Cuenot, Forsythe & Kim, LLC

(57) ABSTRACT

Arrangements described herein relate to automating generation of maps containing message formats and semantic validation rules. First unstructured data defining message formats for messages that conform to a particular standard and second unstructured data defining semantic validation rules to be applied to validate the messages can be scanned. First structured data corresponding to the first unstructured data defining the message formats and second structured data corresponding to the second unstructured data defining the semantic validation rules can be stored into a database. The first structured data and second structured data are configured to be processed to automatically generate a map comprising message formats and sematic validation rules for use in generating messages that conform to the particular standard and validating the messages.

17 Claims, 4 Drawing Sheets

(56) References Cited

OTHER PUBLICATIONS

Baer, T., Data Integration: OEM Strategy and Competitive Edge, An onStrategies Report, Informatica, Mar. 2008, pp. 1-15.*

"Transforming SWIFT MT Messages to their XML representation (MTXML) using XSLT", [online] Ip.com, Disclosure No. IPCOM000208314D, Jul. 1, 2011, Ip.com © 2009-2013, retrieved from the Internet: <http://ip.com/IPCOM1000208314>, 6 pgs.

* cited by examiner

300

```
┌─────────────────────────────────────────────────────────────────────┐
│  Scan, via a processor, first unstructured data defining message    │
│  formats for messages that conform to a particular standard and     │
│  second unstructured data defining semantic validation rules to be  │
│  applied to validate the messages                                   │
│                              305                                    │
└─────────────────────────────────────────────────────────────────────┘
```

```
┌─────────────────────────────────────────────────────────────────────┐
│ Store into a database as database entries first structured data     │
│ corresponding to the first unstructured data defining the message   │
│ formats and second structured data corresponding to the second      │
│ unstructured data defining the semantic validation rules, wherein   │
│ the first structured data and second structured data are configured │
│ to be processed to automatically generate a map comprising message  │
│ formats and sematic validation rules for use in generating messages │
│ that conform to the particular standard and validating the messages │
│                              310                                    │
└─────────────────────────────────────────────────────────────────────┘
```

FIG. 3

AUTOMATING GENERATION OF MESSAGES IN ACCORDANCE WITH A STANDARD

RESERVATION OF RIGHTS IN COPYRIGHTED MATERIAL

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

BACKGROUND

The present invention relates to generation of messages as deliverable products.

The Society for Worldwide Interbank Financial Telecommunication (SWIFT) standard is followed by financial institutions to process financial transactions using a secure network. SWIFT specifies the use of extensible markup language (XML) formatted messages (MX messages) in accordance with the ISO 20022 standard, which is an international standard that defines the ISO platform for development of financial message standards. MX messages are the eventual replacements for SWIFT's proprietary messages in the financial transactions (MT) message format. For the immediate future, both MT and MX formats will be supported by SWIFT. SWIFT commonly refers to this current state of support as "co-existence."

BRIEF SUMMARY

One or more embodiments disclosed within this specification relate to automating generation of maps containing message formats and semantic validation rules.

A method can include scanning, via a processor, first unstructured data defining message formats for messages that conform to a particular standard and second unstructured data defining semantic validation rules to be applied to validate the messages. The method also can include storing into a database as database entries first structured data corresponding to the first unstructured data defining the message formats and second structured data corresponding to the second unstructured data defining the semantic validation rules, wherein the first structured data and second structured data are configured to be processed to automatically generate a map comprising message formats and sematic validation rules for use in generating messages that conform to the particular standard and validating the messages.

Another embodiment can include a system having a processor. The processor can be configured to initiate executable operations including scanning first unstructured data defining message formats for messages that conform to a particular standard and second unstructured data defining semantic validation rules to be applied to validate the messages, and storing into a database as database entries first structured data corresponding to the first unstructured data defining the message formats and second structured data corresponding to the second unstructured data defining the semantic validation rules, wherein the first structured data and second structured data are configured to be processed to automatically generate a map comprising message formats and sematic validation rules for use in generating messages that conform to the particular standard and validating the messages.

Another embodiment can include a computer program product for automating generation of maps containing message formats and semantic validation rules as deliverable products. The computer program product can include a computer-readable storage medium having stored thereon program code that, when executed, configures a processor to perform a method including scanning, by the processor, first unstructured data defining message formats for messages that conform to a particular standard and second unstructured data defining semantic validation rules to be applied to validate the messages, and storing, by the processor, into a database as database entries first structured data corresponding to the first unstructured data defining the message formats and second structured data corresponding to the second unstructured data defining the semantic validation rules, wherein the first structured data and second structured data are configured to be processed to automatically generate a map comprising message formats and sematic validation rules for use in generating messages that conform to the particular standard and validating the messages.

BRIEF DESCRIPTION OF THE SEVERAL VIEWS OF THE DRAWINGS

FIG. 3 is a flow chart illustrating a method of automating generation of maps containing message formats and semantic validation rules in accordance with one embodiment disclosed within this specification.

DETAILED DESCRIPTION

Figure 1:
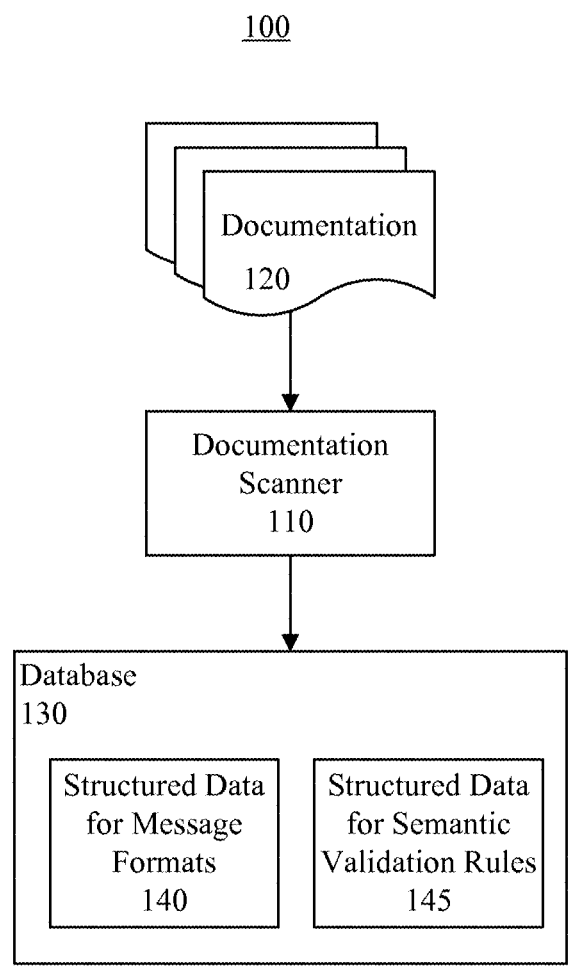
FIG. 1 is a block diagram illustrating a system for automating generation of maps containing message formats and semantic validation rules as deliverables in accordance with one embodiment disclosed within this specification.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer-readable medium(s) having computer-readable program code embodied, e.g., stored, thereon.

Any combination of one or more computer-readable medium(s) may be utilized. The computer-readable medium may be a computer-readable signal medium or a computer-readable storage medium. A computer-readable storage medium may be, for example, but is not limited to, an electronic, magnetic, optical, electromagnetic, infrared, or semiconductor system, apparatus, or device, or any suitable combination of the foregoing. More specific examples (a non-exhaustive list) of the computer-readable storage medium would include the following: an electrical connection having one or more wires, a portable computer diskette, a hard disk drive (HDD), a solid state drive (SSD), a random access memory (RAM), a read-only memory (ROM), an erasable programmable read-only memory (EPROM or Flash memory), an optical fiber, a portable compact disc read-only memory (CD-ROM), a digital versatile disc (DVD), an optical storage device, a magnetic storage device, or any suitable combination of the foregoing. In the context of this document, a computer-readable storage medium may be any tangible medium that can contain, or store a program for use by or in connection with an instruction execution system, apparatus, or device.

A computer-readable signal medium may include a propagated data signal with computer-readable program code embodied therein, for example, in baseband or as part of a carrier wave. Such a propagated signal may take any of a variety of forms, including, but not limited to, electro-magnetic, optical, or any suitable combination thereof. A computer-readable signal medium may be any computer-readable medium that is not a computer-readable storage medium and that can communicate, propagate, or transport a program for use by or in connection with an instruction execution system, apparatus, or device.

Program code embodied on a computer-readable medium may be transmitted using any appropriate medium, including but not limited to wireless, wireline, optical fiber, cable, RF, etc., or any suitable combination of the foregoing. Computer program code for carrying out operations for aspects of the present invention may be written in any combination of one or more programming languages, including an object oriented programming language such as Java™, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer, other programmable data processing apparatus, or other devices create means for implementing the functions/acts specified in the flowchart and/or block diagram block or blocks.

These computer program instructions may also be stored in a computer-readable medium that can direct a computer, other programmable data processing apparatus, or other devices to function in a particular manner, such that the instructions stored in the computer-readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

For purposes of simplicity and clarity of illustration, elements shown in the figures have not necessarily been drawn to scale. For example, the dimensions of some of the elements may be exaggerated relative to other elements for clarity. Further, where considered appropriate, reference numbers are repeated among the figures to indicate corresponding, analogous, or like features.

Arrangements described herein relate to automating generation of deliverable products (hereinafter referred to as "deliverables") comprising structured data for message formats that conform to a particular standard and structured data for semantic validation rules to be applied to such messages when the messages are populated with data. More particularly, unstructured data that define message formats for messages to be generated can be scanned and stored into a database as database entries comprising structured data corresponding to the unstructured data defining the message formats. Further, unstructured data (e.g., pseudo code, spoken language rule descriptions, such as English language rule descriptions, etc.) that define semantic validation rules to be applied to the messages can be scanned and stored into the database as database entries comprising structured data corresponding to the unstructured data defining the semantic validation rules. The structured data can be configured to be processed by a map editor to automatically generate a map comprising message formats and semantic validation rules for use in generating messages that conform to the particular standard and validating the messages.

As used herein, the terms "deliverable product" and "deliverable" mean one or more files comprising structured data configured to be processed to generate a map used to generate and validate messages that comply with a particular standard. For example, a deliverable can comprise a database in which the structured data is stored. As used herein, the term "map" means a data structure that specifies formats for messages and semantic validation rules to be applied to validate the messages in accordance with a particular standard. A map may be compiled into to computer program code executable by a processor to generate messages, receive messages, transform messages from one format to another, and validate massages.

In illustration, a deliverable may include structured data complying with the Worldwide Interbank Financial Telecommunication (SWIFT) standard. In this regard, a deliverable can be used by a financial institution to generate one or more maps used to generate and validate messages used to conduct financial transactions with other financial institutions in compliance with the SWIFT standard. Nonetheless, the present arrangements are not limited to the SWIFT standard. For example, the present arrangements can be used to generate maps that comply with the United Nations/Electronic Data Interchange for Administration, Commerce and Transport (EDIFACT) standard, the American National Standards Institute (ANSI) X12 cross industry standard (X12), standards in conformance with the Health Insurance Portability Act of 1996 (HIPAA), the Automated Clearing House (ACH) rules, the SPEC2000 standard, the Clearing House Interbank Payments System (CHIPS) standard, and/or any other standards that specify particular types of messages to be communicated between processing systems.

The aforementioned standards change from time to time. For example, the SWIFT standard typically is updated annually. The SWIFT standard defines hundreds of different messages that are to be used by financial institutions for electronic transactions. The updates to the SWIFT standard may include not only changes to the structures of defined messages, but also changes to semantic validation rules that are required to be implemented to validate messages. The present arrangements automate implementation of the SWIFT standard and SWIFT standard updates, thereby mitigating the use of human resources required to generate deliverables in compliance with the SWIFT standard, or the most recent version of the SWIFT standard. As noted, the present arrangements are not limited to the SWIFT standard, and can be implemented to automate generation of deliverables that comply with other standards and/or updates to such standards.

FIG. 1 is a block diagram illustrating a system 100 for automating generation of maps containing message formats and semantic validation rules as deliverables in accordance with one embodiment disclosed within this specification. The system 100 can include a documentation scanner 110 that receives documentation 120 comprising at least one document specifying message formats in accordance with a particular specification and/or validation rules for the messages. The specification can be the SWIFT standard, the EDIFACT standard, the X12 standard, the HIPAA standard, the ACH standard, the SPEC2000 standard, the CHIPS standard, and/or any other suitable message format standards. The documentation 120 can include unstructured data and/or pseudo code defining message formats for the messages. The documentation 120 further can include semantic validation rules for the messages. The unstructured data, pseudo code and semantic validation rules can be provided as HyperText Markup Language (HTML) documents, Portable Document Format (PDF) documents and/or Extensible Markup Language (XML) documents.

The documentation scanner 110 can scan the documentation 120 to identify the unstructured data, pseudo code and/or semantic validation rule parameters for the messages, and store to a database 130 database entries corresponding to the unstructured data, pseudo code and/or semantic validation rule parameters for the messages. In this regard, the documentation scanner 110 can process the unstructured data of the documentation 120 and, from the unstructured data, generate structured data 140 for message formats and structured data 145 for semantic validation rules. The structured data 140, 145 can be populated into the database 130. The unstructured data can include parameters defining the structure of messages that are defined in a particular standard and parameters defining semantic validation rules to be applied to validate such messages, for example when the messages are populated with data. In one arrangement, the documentation scanner 110 can parse the pseudo code and tokenize the pseudo code to generate database entries for the structured data 145 for the semantic validation rules.

As used herein, the term "tokenize" means to assign an abstract name to an object to be used in a deliverable, such as a semantic validation rule to be generated to validate a message. In this regard, each object in a generated map containing a message format should have a unique name in order for generated semantic rules to execute properly. Since these unique names are dependent on the implementation of the standard, the semantic rules documentation may simply refer to these objects by their non-unique names. For example, the rules documentation may refer to field tag 53A in Sequence B. If 53A occurs in Sequence A, then the unique names assigned by the documentation scanner 110 can be "53A:1" (for Sequence A) and "53A:2" for Sequence B. Using a tokenization naming convention, a token can be converted to its proper unique name when the rules are generated for a message. Furthermore, tokenization allows rules to be properly migrated to their proper locations even when the message format changes (e.g., in a new version a new Sequence called A1 is added with field tag 53A). In this example the new unique name for field tag 53A in Sequence B should now be "53A:3." A token for this example for field tag 53A in Sequence B could be, for instance, be "<TOKEN~B~53A~1>". When message formats or semantic validation rules are generated from the structured data 140, 145, the references can be de-tokenized and mapped to their proper objects (e.g. "53A:2"). In this example the "1" refers to the instance of the field tag 53A within Sequence B itself. Sequence names, however, are unique and do not have to be tokenized by instance.

The structured data 140, 145 can be stored to a plurality of tables in the database. The structured data 140, 145 can comprise information (e.g., parameters) related to specifications for the structures of the messages, information (e.g., parameters) related to semantic validation rules to be applied to such messages when the messages are passed to a map for validation, business names to be populated into the fields of messages, etc.

Non-limiting examples of tables and database fields to which the structured data 140, 145 is populated are provided below. Message formats generated from the structured data 140 also may include fields. To distinguish between database fields and message fields herein, database fields simply will be referred to as "fields," and message fields will be referred to as "message fields."

In illustration, the database 130 can include a Versions table, which may be populated with an individual record for each version of a particular standard. The Versions table can include a plurality of fields, for example a VersionID field that stores a unique database identifier for each version record, a VersionDate field that stores a date associated with the version, a VersionName field that stores a name for the version, and a VersionDescription field that provides one or more additional details corresponding to the version. The record for a version of the particular standard can be generated when the documentation 120 for that version of the standard is scanned.

The database 130 also can include a MessageTypes table, which may be populated with a listing of all scanned message types for a particular version of the standard. Each record can correspond to a particular message type. The MessageTypes table can include a plurality of fields, for example, MessageTypeID field that stores a unique database identifier for a corresponding message type record; a Name field that stores a name of the message; a Description field that provides a description of the message; a MessageType field that stores a numeric identifier of the message type; a MessageExtension field that, if applicable, stores a "message extension" validation flag for the message (e.g., straight-through-processing (STP)); and a VersionDate field that stores the date of the corresponding version of the standard.

The database 130 also can include a Sequences table that is populated with the sequences and the start/end positions for the fields in each sequence. Each record in the table can correspond to a particular sequence. The Sequences table can include a plurality of fields, for example, a SequenceID field that stores a unique database identifier for a sequence record; a SequenceName field that stores the name of the sequence in a corresponding message; a SequenceDescription field that stores a description of the sequence; a PositionStart that stores a message field starting position for the sequence in the corresponding message; a PositionEnd field that stores a message field ending position for the sequence in the corresponding message; a MinUsage field that stores the minimum number of times the sequence must appear in the corresponding message; a MaxUsage field that stores the maximum number of times the sequence can appear in the corresponding message; and a ChoiceType field that indicates whether the sequence optionally can be part of a "choice" between other sequences. If the sequence is part of a choice, it can be either one of three values: START, INSIDE and END. The sequence table also can include an IsGroup field that stores a value indicating whether the sequence is an implicit sequence that is a group of repeating message fields. These implicit sequences can be defined with an "R_" prefix for the name. This field can be a Boolean set to "Yes" if the sequence is an implicit group. The sequence table also can include an IsActive field that stores a value indicating whether or not the sequence is active. This value always can be "Yes" for certain standards, such as the SWIFT standard. However, Market Practices can be defined by customers where certain optional sequences can be de-activated. The sequence table also can include a MessageType field, which stores a numeric identifier of the corresponding message; a MessageExtension field that, if applicable, stores the "message extension" validation flag for the corresponding message (e.g., STP); and a VersionDate field that stores the date of the version of the standard.

The database 130 also can include a Messages table that is populated with fields belonging to each sequence in a message format. Each record in the table can correspond to a particular message type. The Messages table can include a plurality of fields, for example a MessageID field that stores unique identifier for the message record; a FieldTag field that stores a name of a message field tag at the defined position in a sequence or group; a Qualifiers field that stores a list of valid qualifiers for the message field tag; a Position field that stores the numeric position of the message field within the sequence or group; and an Order field that stores a value that is used to define a set of message fields that can appear in any order. For example, all message fields defined with an order of "2" can be part of a set where those message fields can appear in any order. Order can be a "set identifier." The Messages table also can include a MinUsage field that stores a value indicating the minimum number of times the message field should appear in the sequence or group; a MaxUsage field that stores a value indicating the maximum number of times the message field can appear in the sequence or group; a MessageType field that stores a numeric identifier of the message; a MessageExtension field that, if applicable, stores a "message extension" validation flag for the message (e.g., STP); a SequenceName field that stores the name of the sequence the message field belongs to; a GroupName field indicating whether the message field belongs to an "implicit" group of repeating message fields, the name of the implict group (e.g. "R_1"); a StartDelimiter field that, if defined, stores the starting delimiter of the message field (e.g., ":"); an EndDelimiter field that, if defined, stores the ending delimiter of the message field (e.g., a Carriage-Return Line-Feed (CRLF) pair); and an IsActive field that stores a Boolean value, which can be "Yes" if the message field is active within the sequence. This is always true for the certain standards, but not others. Certain message fields can be de-activated for Market Practices implemented by customers. A VersionDate field also can be provided in the Message table to store the date of the version of the standard.

The database 130 also can include a Fields table that defines the components that make up an individual message field tag (e.g., "22F" of the SWIFT standard). Components are individual pieces of discrete data. For instance, a message field tag may include a currency and an amount. Currency and amount are considered to be separate components. The Fields table can include a plurality of fields, for example a FieldID field which stores a unique identifier for the message fields record; a FieldTag field that stores the name of the message field tag containing components; a Name field that stores the name of the component belonging to the message field tag; a StartDelimiter field that stores the starting delimiter of the component, if applicable; an EndDelimiter field that stores the ending delimiter of the component, if applicable; a DataType field that stores a value corresponding to the data type of the component (e.g. String, Numeric, etc.); and a DataFormat field that stores the data format of the component. Strings may have a restricted character set. Numerics may only allow a certain number of decimal places, etc. The Fields table also can include a MessageType field which stores a numeric identifier of a message (e.g., a SWIFT message). This only needs to be set to the message type if the message field tag has a particular syntax for that message type. In general, the message field tag syntaxes are the same across all messages but there are some exceptions and this field allows for accounting of such exceptions. The Fields table also can include a MessageExtension field that, if applicable, stores the "message extension" validation flag for the message (e.g., STP); a Position field that stores the position the component appears within the message field tag; a MinUsage field that stores the minimum number of times the component should appear; a MaxUsage field that stores the maximum number of times the component can appear; a MinLength field that stores the minimum length of the component; a MaxLength field that stores the maximum length of the component; and a VersionDate field that stores the date of the version of the standard.

The database 130 also can include a Syntaxes table that stores the syntaxes for each message field tag and version. The Syntaxes table can include a plurality of fields, for example, a SyntaxID field that stores a unique identifier for the syntax record; a FieldTag field that stores the name of the message field tag associated with the syntax; a Syntax field that stores a syntax definition of the message field tag; and a MessageTypes field that, if applicable, stores the message types associated with the syntax record. This can be used in cases where the message field tag syntax is different depending on the message type. The Syntaxes table also can store a Rule1 field (e.g., for particular syntax rule of a standard) that, if checked, indicates the optional characters CRLF are to be used in the case where at least one of the components preceding the CRLF is used. If all components preceding the CRLFs are missing, then the CRLF should not be used. The Syntaxes table also can store a Rule2 field that, if checked, indicates there special code word validations associated with the message field tag; a Rule3 field that, if checked, indicates the data content of this field may not begin with a '/', nor may it end with a '/', nor may it contain '//' (2 consecutive slashes) anywhere within its contents. If the field has multiple lines, each line may be validated independently to confirm each line does not begin with a '/', nor end with a '/', nor contain '//'. The Syntaxes table also can store a Rule4 field that, if checked, indicates at least one optional component should be present; a Rule5 field that, if checked, indicates to use a particular character set validation; and a Version field that indicates the date of the version of the standard.

The database 130 also can include a BusinessElements table that defines the user-friendly business name of each message field tag and qualifier in the specified message and sequence. The BusinessElements table can include a plurality of fields, for example, an ElementID field that stores a unique identifier for the business elements record; a FieldTag field that stores the message field tag associated with the business name; a Qualifier field that stores a qualifier of the message field tag associated with the business name; a BusinessName field that stores the business name associated with the message field tag and qualifier; a MessageType field that stores the message type where the message field tag resides; a MessageExtension that, if applicable, stores a message extension validation flag for the message (e.g., STP); and a MessageSequence field that stores the sequence in the message where the message field tag resides. Sometimes a message field tag may have a different name within the same message type based on the sequence. The BusinessElements table also can include a Version field that indicates the date of the version of the standard.

The database 130 also can include a PropMTCodeWordsID table that stores a unique database identifier for each code words record. The PropMTCodeWordsID table can include a plurality of fields, for example a FieldTag field that stores the message field tag associated with the code words; a Qualifier field that stores the qualifier associated with the code words; a Subfield field that stores the location of the component within the message field tag that has the code word; a MessageType field that stores the message type associated with the message field tag and qualifier; a MessageExtension field that, if applicable, stores the "message extension" validation flag for the message (e.g., STP); a Version field that indicates the date of the version of the standard; a SequenceName field that stores information indicating the sequence where the message field tag appears; a Position field that stores information indicating the position where the message field tag appears; an Order field that stores information indicating the order to which the message field tag belongs (e.g., it may belong to a set of message field tags that can appear in any order); and a DSSNotPresent field that stores a Boolean indicating whether a validation should only be performed when a DSS component is not defined in the data. Some validations are only performed when the Data Source Scheme (DSS) is not present. This Boolean, when "Yes," indicates that the validation should only be performed when the DSS component is not defined in the data. The PropMTCodeWordsID table also can include a CodeWords field that stores the list of valid code words associated with the message field tag and qualifier for the defined message type and sequence.

The database 130 also can include a PropFieldCodeWords table that defines special code word exception validations that are needed when a message field tag has Syntax Rule 2 (**) checked in the Syntaxes table. The PropFieldCodeWords table can include a plurality of fields, for example, a PropFieldCodeWordsID field that stores a unique database identifier for the field code words record; a FieldTag field that stores a message field tag needing special code word validation; and a Subfield field that stores an identifier for subfield within a message field containing the component needing special code word validation. Subfields are normally delimited by slash characters. The PropFieldCodeWords table also can include a Component field that stores an identifier for a component within the subfield needing special code word validation; a MessageType field that stores an indicator of the message type where the message field tag appears; a SequenceName field that stores the sequence name where the message field tag appears; a CodeWords field that stores a list of legal code words for the component within the message field tag; an IsCurrencyValidated field that indicates whether ISO currency values will be allowed code word values. Some validations allow a list of code words plus the list of ISO defined currencies. If checked, the IsCurrencyValidated field indicates that ISO currency values will be allowed code word values. The PropFieldCodeWords table also can include an ErrorCode field that stores a special error code to report if the code word in the data is not valid; and a Version field that indicates the date of the version of the standard.

The database 130 also can include a MessageRulesTokenized table that contains semantic validation rules. The rules can be stored as pseudo-code that can be used to generate executable code using a desired language. The term "tokenized" refers to tokens in the pseudo code that represent objects of a corresponding standard (e.g. sequence, message field tag, component, etc.). Tokens can be resolved to actual names of objects when the message format is generated for a translation map. The MessageRulesTokenized table can include a plurality of fields, for example, a MessageRuleID field that stores a unique identifier for the message rules record; a MessageType field that stores an indicator of the message type to which the rule belongs; a MessageExtension field that, if applicable, stores a message extension validation flag for the message (e.g., STP); a Sequence field that indicates the name of the sequence where the rule should be executed; a FieldTag field that stores the name of the message field tag where the rule should be executed; a Subfield field that stores the name of the subfield (of the message field tag) where the rule should be executed; a FieldTagInstance field that stores information used to distinguish between multiple message field tags of the same name within a sequence, such as a numeric value for the instance of the message field tag where the rule should be executed; a SubfieldInstance field that stores information used to distinguish between multiple subfields of the same name within a message field tag (e.g. a message field tag that contains two or more currencies), such as the numeric value of the instance of the subfield where the rule should be executed; an ExtendedRule field that stores the actual pseudo code and tokens used for implementing a semantic validation rule; an IsOnEnd field that stores information used to determine whether a rule that executes on a sequence should execute at the beginning of the sequence, or, at the end of the sequence after the contents of the sequence have been processed; and a version field that stores the date of the version of the standard.

The foregoing tables are merely examples of tables that can be contained in the database 130. Other tables may be used in lieu of, or in addition to, these example tables, and the present arrangements are not limited in this regard. Nonetheless, once the structured data 140, 145 is populated to the database 130, the structured data 140, 145 (e.g., the database 130) can be provided to a customer as deliverables.

As noted, the structured data 140 defines the structure of messages that conform to a particular standard, and the structured data 145 defines semantic validation rules to be applied to validate the generated messages. The structured data 140 can be configured to be processed by a map editor, which will be described, to generate a map used to generate messages that comply with the standard and have the proper message format. The messages can be formatted as HTML documents, PDF documents, XML documents, or in any other suitable format. The structured data 145 can define the structure of semantic validation rules that conform to the particular standard, and can be configured to be processed by the map editor to generate semantic validation rules in the map to perform validation on messages that are generated by the map, or perform validation on received messages (e.g., messages received from another entity).

In one arrangement, at least a portion of structured data 145 can include data stored in a rule library containing the pseudo code. The rule library can contain functions that are standalone functions not tied to the structure of any particular message. Further, at least a portion of the structured data 145 can be stored in setup code that contains de-tokenized data gathered from the MESSAGE RULES TOKENIZED table. The setup code can be configured to be populated in a generated semantic validation rule. In this regard, the setup code can be tied to a structure of a map generated by a map editor, and executed conditionally, depending on the data passed to the map for processing.

For example, a simple rule (Rule C67 for message MT516 as defined by the SWIFT standard) may be specified in the documentation 120 as unstructured data:

```
RULE 67 (C67)
MT 516 (sequence A)
In sequence A of MT 516, either field 83C or 87( ), but not
both, may be present.
IF <message '516'> THEN
    IF <field '83C'> AND <sequence 'A':field '87*'>
    THEN <error: 'C67'>
    ENDIF
ENDIF
```

The rule contains pseudo code and spoken language words (e.g., spoken language rule descriptions) which the documentation scanner 110 can parse and convert into generated code. With every rule there may be the rule itself, which is not tied to the structure of the map, and the setup code which is tied to the structure of the map and the data passed to the map for processing. The documentation 120 can be scanned and the rule can be turned into code which is stored in the rule library. In this regard, the documentation scanner 110 can be configured to identify pseudo code in the documentation 120. In cases where the pseudo code is not provided in the documentation, the documentation scanner 110 can parse the spoken language rule descriptions and identify keywords, message field tags and sequences. For example, the documentation scanner 110 can identify such rules by scanning for keywords (e.g. "RULE," "MT"). In this example the pseudo code and spoken language rule descriptions can be converted into a rule library function, for example:

```
<Rule>
<RuleName>Rule67</RuleName>
<RuleText>if is83CPresent & (is87APresent |
is87DPresent) then
    cerror(1092, error1);</RuleText>
<RulePurpose></RulePurpose>
<ReturnType></ReturnType>
<RunRuleAsTextSubtitution>no</RunRuleAsTextSubtitution>
<Parameters>
<Parameter>
<ParamName>is 83CPresent</ParamName>
<ParamType>Integer</ParamType>
<PassingMech>IN</PassingMech>
</Parameter>
<Parameter>
<ParamName>is 87APresent</ParamName>
<ParamType>Integer</ParamType>
<PassingMech>IN</PassingMech>
</Parameter>
<Parameter>
<ParamName>is87DPresent</ParamName>
<ParamType>Integer</ParamType>
<PassingMech>IN</PassingMech>
</Parameter>
<Parameter>
<ParamName>error1</ParamName>
<ParamType>String[20]</ParamType>
<PassingMech>IN</PassingMech>
</Parameter></Parameters>
</Rule>
<Rule>
```

Further, numeric error codes can be assigned for each identified rule. Thus, in this example the error code "1092" is assigned for Rule C67.

The documentation scanner 110 also can generate setup code for the message rules, such as the above example rule. The documentation scanner 110 can store the setup code in the MessageRulesTokenized table previously described. In the above example, conditions can be determined based on data mapped to a message, such as is83CPresent, is87APresent and is87DPresent. The setup code can be generated and executed at the "end" of Sequence A:

```
call SWIFT.Rule67(EXIST(%83C), EXIST(%87A),
    EXIST(%87D), FindObjectName("A:87A"));
```

The EXIST function can determine whether or not the specified message field tag exists in the data. The FindObjectName function can return the unique name of the specified field in the generated map. In this example, the function would return "87A:1." The FindObjectName function can return the unique name of the specified field in the generated map. In this example, the function would return "87A:1." The setup code also can include customized functions that call certain procedures to be performed on, or validate, a particular message.

The setup code can be stored in the MessageRulesTokenized database table and the individual message field tag references can be "tokenized," for example as follows:

```
MessageType: 516
Sequence: A
FieldTag:
Subfield:
FieldTagInstance:
SubfieldInstance:
IsOnEnd: true
Version: 20131101
ExtendedRule: call
SWIFT.Rule67(EXIST(%<TOKEN~A~83C:1>),
EXIST(%<TOKEN~A~87A:1>),
EXIST(%<TOKEN~A~87D:1>),
FindObjectName("A:87A"));
```

In this particular example the setup code is executing at the end of the sequence. Thus, the FieldTag, Subfield, FieldTagInstance, and SubfieldInstance location database fields are not applicable. For a rule that requires setup code on a message field or subfield, however, those database fields can be populated appropriately with location information for where the setup code should be executed.

Notwithstanding the previous example, structured data 145 also can define qualifiers and their associated word validations, business names of elements generated in message formats, special code word exceptions, and error codes associated with syntax validation of field data. One or more subsets of structured data 145 also can be implemented. Other semantic validation rules may be complex and require a developer to create code corresponding to such semantic validation rules. For example, a rules scripting language can be used for this purpose. The rules scripting language can be Java™ or another suitable programming language. Further, structured data 145 for semantic validation rules that have not changed between respective versions of a standard can be migrated from an earlier version of the standard to a later version of the standard.

In addition to the structured data 140, 145, the deliverables also can include one or more pass-through maps. With a pass-through map, a message processed by the map is not changed, but the validation rules still are executed on the message. Thus, the same deliverable can be generated for both input and output sides of the map. In this regard, the pass-through maps can be utilized to validate both received messages and generated messages.

Figure 2:
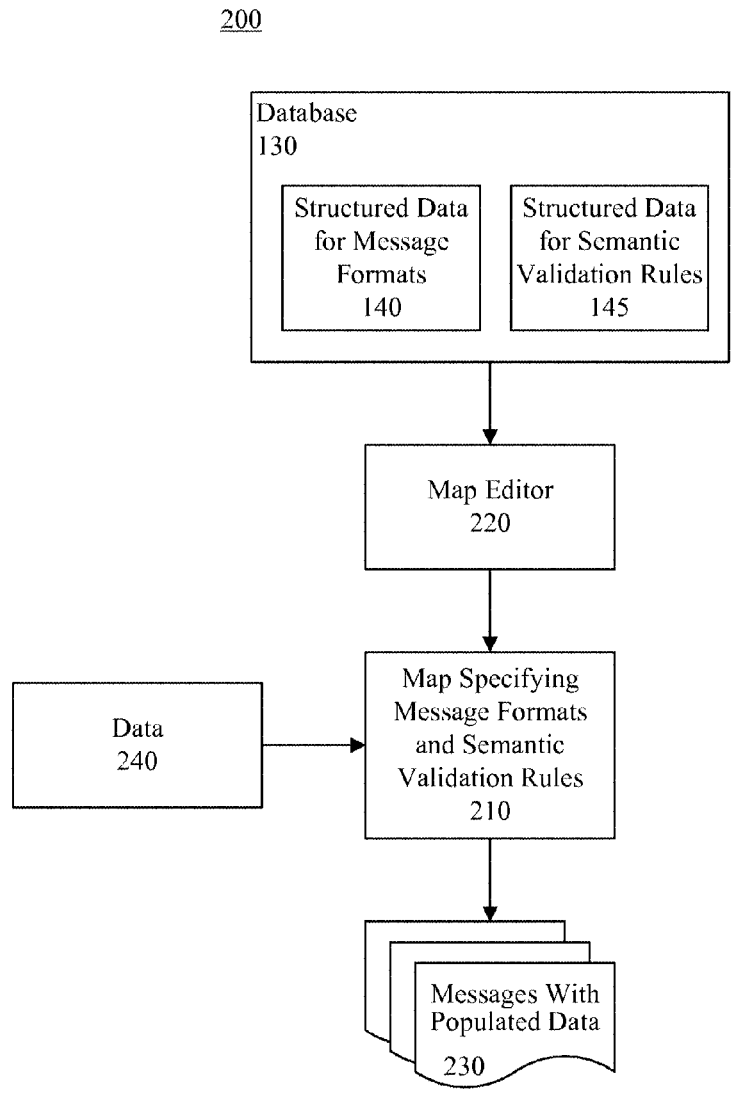
FIG. 2 is a block diagram illustrating a system for generating a map containing message formats and semantic validation rules from structured data in accordance with one embodiment disclosed within this specification.

FIG. 2 is a block diagram illustrating a system 200 for generating a map 210 containing message formats and semantic validation rules from the structured data 140, 145 contained in the database 130, for example using a map editor 220. As used herein, the term "map editor" means a computer program configured to automatically generate maps specifying message formats and semantic validation rules for messages from structured data, the message formats and semantic validation rules complying with a particular standard. After generating the map 210, the map editor 220 can compile the map 210 into suitable program code executable by a processor.

Once compiled, the map 210 can be used to generate and validate messages 230 populated with data 240, the messages 230 conforming to a particular standard. The data 240 can be input by a user and/or retrieved from a suitable database. In illustration, the map 210 can map the data 240 into appropriate fields of messages 230 in a manner that allows the data 240 to be identified and parsed from the messages 230 by another suitably configured processing system to which the message 230 is sent as an outbound message (e.g., another processing system including a respective map). The map 210 also can be used by a user, via a suitable user interface, to edit and/or customize the message 230 for business processes. The messages 230 can be configured as HTML messages, XML messages, or configured in any other suitable format.

When the map editor 220 generates the message 230, but before the message 230 is sent as an outbound message, the map editor 220 can access the structured data 145 for semantic validation rules that are applicable to the message 230. From the structured data 145, the map editor 220 can generate one or more semantic validation rules that comply with the particular standard to which the message 230 complies, and process the semantic validation rules to validate the message. For example, the semantic validation rules can be configured as HTML, XML, or configured in any other suitable format.

In one arrangement, the map 210 can itemize the semantic validation rules that are applicable to a particular message 230. The semantic validation rules can be applied to the messages 230 when the messages 230 are populated with data to confirm that the data 240 complies with the particular standard. In illustration, the semantic validation rules can perform validation on data entered into each field of the messages 230 to ensure that the data in each field complies with the particular standard. The semantic validation rules also can perform validation on the entirety of data 240 populated to a message 230 to ensure that all data required by the standard to be present in the message 230 indeed is present, that no data is present that, in accordance with the standard, should not be present, and that the data in various fields of the populated message 230 appropriately correlate and such data is appropriate for the message 230. In illustration, each semantic validation rule implementation can be called with parameters necessary for evaluating the message's compliance with the rule. The map 210 also can generate validation reports indicating results of validations performed on the messages 230.

If a message 230 does not comply with an applicable standard, the user or processing system populating the data 240 to the message 230 can be presented an alert indicating the message 230 does not comply with the applicable standard, and communication of the message 230 to another processing system can be halted. If the validation of the message 230 and one or more fields contained in the message 230 do comply with the applicable standard, the message 230 can be communicated to another processing system (e.g., of a recipient to whom the message 230 is sent) as an outbound message.

The map 210 also can be used to validate received (inbound) messages (not shown) to confirm whether the received messages conform to the particular standard. In this regard, the map 210 can specify message formats and semantic validation rules for inbound messages. Further, the map 210 can provide mappings between inbound messages and outbound messages for cases in which the map 210 transforms an inbound message from one format to another. For example, a SWIFT message can be converted into another format, such as an EDI message or some type of positional format. In this regard, the map 210 can have both in input side and an output side. The map 210 also can generate validation reports indicating results of validations performed, using semantic validation rules generated from the structured data 145, on inbound messages and outbound messages transformed from the inbound messages.

FIG. 3 is a flow chart illustrating a method 300 of automating generation of maps containing message formats and semantic validation rules in accordance with one embodiment disclosed within this specification. At step 305, via a processor, first unstructured data defining message formats for messages that conform to a particular standard and second unstructured data defining semantic validation rules to be applied to validate the messages can be scanned. The unstructured data can be provided as HTML documents, PDF documents, XML documents, or in any other suitable format. In one arrangement, the second unstructured data can comprise pseudo code and/or spoken language rule descriptions. A particular document that is scanned may include both the first and second unstructured data, but the invention is not limited in this regard. Moreover, the first unstructured data and/or the second unstructured data may be specified across a plurality of documents.

At step 310, first structured data corresponding to the first unstructured data defining the message formats and second structured data corresponding to the second unstructured data defining the semantic validation rules can be stored into a database as database entries. The first structured data and second structured data are configured to be processed, for example by a map editor, to automatically generate a map comprising message formats and sematic validation rules for use in generating messages that conform to the particular standard and validating the messages.

In one arrangement, pseudo code contained in the second unstructured data can be parsed and to tokenized to generate database entries for the semantic validation rules. Further, spoken language rule descriptions contained in the second unstructured data can be parsed to identify keywords, field tags and/or sequences in the spoken language rule descriptions, and the spoken language rule descriptions can be converted into one or more rule library functions.

Figure 4:
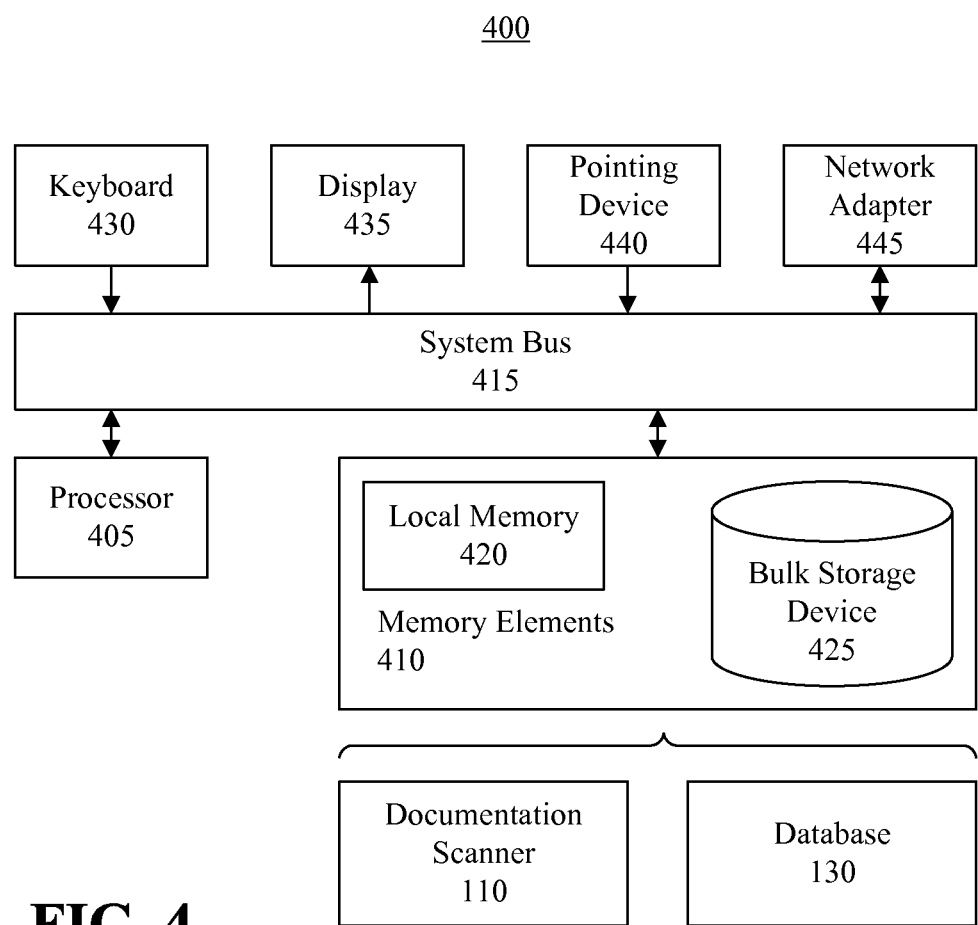
FIG. 4 is a block diagram of a processing system for automating generation of maps containing message formats and semantic validation rules as deliverables in accordance with one embodiment disclosed within this specification.

FIG. 4 is a block diagram of a processing system 400 for automating generation of maps containing message formats and semantic validation rules as deliverables in accordance with one embodiment disclosed within this specification. The processing system 400 can include at least one processor 405 (e.g., a central processing unit) coupled to memory elements 410 through a system bus 415 or other suitable circuitry. As such, the processing system 400 can store program code within the memory elements 410. The processor 405 can execute the program code accessed from the memory elements 410 via the system bus 415. It should be appreciated that the processing system 400 can be implemented in the form of any system including a processor and memory that is capable of performing the functions and/or operations described within this specification. For example, the processing system 400 can be implemented as a computer, a workstation, a mobile computer, a laptop computer, tablet computer, a smart phone, a personal digital assistant, a gaming device, an appliance, and so on.

The memory elements 410 can include one or more physical memory devices such as, for example, local memory 420 and one or more bulk storage devices 425. Local memory 420 refers to RAM or other non-persistent memory device(s) generally used during actual execution of the program code. The bulk storage device(s) 425 can be implemented as a hard disk drive (HDD), solid state drive (SSD), or other persistent data storage device. The processing system 400 also can include one or more cache memories (not shown) that provide temporary storage of at least some program code in order to reduce the number of times program code must be retrieved from the bulk storage device 425 during execution.

Input/output (I/O) devices such as a keyboard 430, a display 435 and a pointing device 440 optionally can be coupled to the processing system 400. The I/O devices can be coupled to the processing system 400 either directly or through intervening I/O controllers. For example, the display 435 can be coupled to the processing system 400 via a graphics processing unit (GPU), which may be a component of the processor 405 or a discrete device. One or more network adapters 445 also can be coupled to processing system 400 to enable processing system 400 to become coupled to other systems, computer systems, remote printers, and/or remote storage devices through intervening private or public networks. Modems, cable modems, transceivers, and Ethernet cards are examples of different types of network adapters 445 that can be used with processing system 400.

As pictured in FIG. 4, the memory elements 410 can store the components of the system 100 of FIG. 1, namely the documentation scanner 110. Being implemented in the form of executable program code, the documentation scanner 110 can be executed by the processing system 400 to perform functions described herein and, as such, can be considered part of the processing system 400. The memory elements 410 also can store the database 130, or the database 130 can be stored on one or more systems to which the processing system 400 is communicatively linked, for example via the network adapter(s) 445. Moreover, the documentation scanner 110 and the database 130 are functional data structures that impart functionality when employed as part of the processing system 400 of FIG. 4.

Like numbers have been used to refer to the same items throughout this specification. The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a," "an," and "the" are intended to include the plural forms as well, unless the context clearly indicates otherwise. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof.

Reference throughout this specification to "one embodiment," "an embodiment," or similar language means that a particular feature, structure, or characteristic described in connection with the embodiment is included in at least one embodiment disclosed within this specification. Thus, appearances of the phrases "in one embodiment," "in an embodiment," and similar language throughout this specification may, but do not necessarily, all refer to the same embodiment.

The term "plurality," as used herein, is defined as two or more than two. The term "another," as used herein, is defined as at least a second or more. The term "coupled," as used herein, is defined as connected, whether directly without any intervening elements or indirectly with one or more intervening elements, unless otherwise indicated. Two elements also can be coupled mechanically, electrically, or communicatively linked through a communication channel, pathway, network, or system. The term "and/or" as used herein refers to and encompasses any and all possible combinations of one or more of the associated listed items. It will also be understood that, although the terms first, second, etc. may be used herein to describe various elements, these elements should not be limited by these terms, as these terms are only used to distinguish one element from another unless stated otherwise or the context indicates otherwise.

The term "if" may be construed to mean "when" or "upon" or "in response to determining" or "in response to detecting," depending on the context. Similarly, the phrase "if it is determined" or "if [a stated condition or event] is detected" may be construed to mean "upon determining" or "in response to determining" or "upon detecting [the stated condition or event]" or "in response to detecting [the stated condition or event]," depending on the context.

The corresponding structures, materials, acts, and equivalents of all means or step plus function elements in the claims below are intended to include any structure, material, or act for performing the function in combination with other claimed elements as specifically claimed. The description of the embodiments disclosed within this specification have been presented for purposes of illustration and description, but are not intended to be exhaustive or limited to the form disclosed. Many modifications and variations will be apparent to those of ordinary skill in the art without departing from the scope and spirit of the embodiments of the invention. The embodiments were chosen and described in order to best explain the principles of the invention and the practical application, and to enable others of ordinary skill in the art to understand the inventive arrangements for various embodiments with various modifications as are suited to the particular use contemplated.

What is claimed is:

1. A method of automating generation of maps containing message formats and semantic validation rules, the method comprising:

scanning, via a processor, first unstructured data defining the message formats for messages that conform to a particular standard and second unstructured data comprising pseudo code and defining the semantic validation rules to be applied to validate the messages;

storing into a database as database entries first structured data corresponding to the first unstructured data defining the message formats and second structured data corresponding to the second unstructured data defining the semantic validation rules, wherein the first structured data and second structured data are configured to be processed to automatically generate a map comprising message formats and sematic validation rules for use in generating messages that conform to the particular standard and validating the messages;

parsing the pseudo code; and tokenizing the pseudo code to generate the database entries for the semantic validation rules.

2. The method of claim 1, wherein
the first structured data and second structured data are configured to be processed by a map editor to automatically generate the map.

3. The method of claim 1, wherein
the first unstructured data defining message formats for the messages is contained in at least one document selected from a group consisting of an HTML document, a PDF document and an XML document.

4. The method of claim 1, wherein
the pseudo code is contained in at least one document selected from a group consisting of an HTML document, a PDF document and an XML document.

5. The method of claim 1, wherein
the second unstructured data comprises spoken language rule descriptions, the method further comprising:

parsing the spoken language rule descriptions to identify keywords in the spoken language rule descriptions; and converting the spoken language rule descriptions into at least one rule library function.

6. The method of claim 5, further comprising:
parsing the spoken language rule descriptions to identify field tags and sequences.

7. The method of claim 5, wherein the spoken language rule descriptions are contained in at least one document selected from a group consisting of an HTML document, a PDF document and an XML document.

8. A system comprising:
a processor configured to initiate executable operations comprising:

scanning first unstructured data defining message formats for messages that conform to a particular standard and second unstructured data comprising pseudo code and defining semantic validation rules to be applied to validate the messages;

storing into a database as database entries first structured data corresponding to the first unstructured data defining the message formats and second structured data corresponding to the second unstructured data defining the semantic validation rules, wherein the first structured data and second structured data are configured to be processed to automatically generate a map comprising message formats and sematic validation rules for use in generating messages that conform to the particular standard and validating the messages;

parsing the pseudo code; and tokenizing the pseudo code to generate the database entries for the semantic validation rules.

9. The system of claim 8, wherein
the first structured data and second structured data are configured to be processed by a map editor to automatically generate the map.

10. The system of claim 8, wherein
the first unstructured data defining message formats for the messages is contained in at least one document selected from a group consisting of an HTML document, a PDF document and an XML document.

11. The system of claim 8, wherein
the pseudo code is contained in at least one document selected from a group consisting of an HTML document, a PDF document and an XML document.

12. The system of claim 8, wherein
the second unstructured data comprises spoken language rule descriptions, the processor further configured to initiate executable operations comprising:

parsing the spoken language rule descriptions to identify keywords in the spoken language rule descriptions; and converting the spoken language rule descriptions into at least one rule library function.

13. The system of claim 12, the processor further configured to initiate executable operations comprising:

parsing the spoken language rule descriptions to identify field tags and sequences.

14. The system of claim 12, wherein the spoken language rule descriptions are contained in at least one document selected from a group consisting of an HTML document, a PDF document and an XML document.

15. A computer program product for automating generation of maps containing message formats and semantic validation rules as deliverable products, the computer program product comprising a computer readable storage device having program code stored thereon, the program code executable by a processor to perform:

scanning, by the processor, first unstructured data defining the message formats for messages that conform to a particular standard and second unstructured data comprising pseudo code and defining the semantic validation rules to be applied to validate the messages;

storing, by the processor, into a database as database entries first structured data corresponding to the first unstructured data defining the message formats and second structured data corresponding to the second unstructured data defining the semantic validation rules, wherein the first structured data and second structured data are configured to be processed to automatically generate a map comprising message formats and sematic validation rules for use in generating messages that conform to the particular standard and validating the messages;

parsing the pseudo code; and tokenizing the pseudo code to generate the database entries for the semantic validation rules, wherein the computer readable storage device does not consist of a transitory, propagating signal.

16. The computer program product of claim 15, wherein the first structured data and second structured data are configured to be processed by a map editor to automatically generate the map.

17. The computer program product of claim 15 wherein the first unstructured data defining message formats for the messages is contained in at least one document selected from a group consisting of an HTML document, a PDF document and an XML document.

\* \* \* \* \*